(12) United States Patent
Morii et al.

(10) Patent No.: US 6,842,596 B2
(45) Date of Patent: Jan. 11, 2005

(54) RECYCLING APPARATUS, RECYCLING METHOD, AND RECYCLED PRODUCT

(75) Inventors: Yoshihiro Morii, Kanagawa (JP); Satosu Souma, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 73 days.

(21) Appl. No.: 10/379,532

(22) Filed: Mar. 6, 2003

(65) Prior Publication Data

US 2003/0215260 A1 Nov. 20, 2003

(30) Foreign Application Priority Data

Mar. 6, 2002 (JP) ........................ 2002-060956

(51) Int. Cl.⁷ .............................................. G03G 15/00
(52) U.S. Cl. ................... 399/109; 241/24.1; 241/24.14; 399/12; 399/24
(58) Field of Search ............................. 399/12, 24, 25, 399/109; 241/24.1, 24.14

(56) References Cited

U.S. PATENT DOCUMENTS

| | | | |
|---|---|---|---|
| 6,000,784 A | 12/1999 | Takemoto et al. | |
| 6,173,128 B1 * | 1/2001 | Saber et al. ................... | 399/24 |
| 6,217,684 B1 | 4/2001 | Morii et al. | |
| 6,224,709 B1 | 5/2001 | Takemoto et al. | |
| 6,435,241 B1 | 8/2002 | Morii et al. | |
| 6,471,801 B2 | 10/2002 | Takemoto et al. | |
| 6,472,247 B1 | 10/2002 | Andoh et al. | |
| 6,487,377 B2 * | 11/2002 | Naito et al. ................... | 399/12 |
| 6,503,358 B1 | 1/2003 | Takemoto et al. | |
| 6,544,376 B2 | 4/2003 | Takemoto et al. | |
| 6,560,438 B2 | 5/2003 | Kosuge | |
| 6,578,783 B2 * | 6/2003 | Simon et al. ............. | 241/24.14 |
| 6,679,442 B2 * | 1/2004 | Morii et al. ................ | 241/24.1 |

FOREIGN PATENT DOCUMENTS

| | | |
|---|---|---|
| JP | 7-306576 | 11/1995 |
| JP | 7-334583 | 12/1995 |
| JP | 3060318 | 6/1999 |
| JP | 2000-084532 | 3/2000 |
| JP | 2000-181958 | 6/2000 |
| JP | 2000-206843 | 7/2000 |

* cited by examiner

Primary Examiner—Hoan Tran
(74) Attorney, Agent, or Firm—Oblon, Spivak, McClelland, Maier & Neustadt, P.C.

(57) ABSTRACT

Information about a recycling item is input, a first sorting condition is prepared so as to sort the recycling item into one of a plurality of groups corresponding to conditions for decomposing the recycling item, a second sorting condition is prepared so as to sort recycling parts, which are obtained by decomposing the recycling item sorted out according to the first sorting condition, into at least one of a plurality of material groups corresponding to material of each of the recycling parts; a third sorting condition is prepared so as to sort the recycling parts sorted out according to the second sorting condition, into at least one of a plurality of processing groups corresponding to types of recycling processing to be carried out. Finally, the first, second, and the third sorting conditions are transmitted to respective fields where the recycling item and the recycling parts are sorted.

26 Claims, 13 Drawing Sheets

| NAMES OF RECYCLING ITEMS | PRE-SORTING GROUP |
|---|---|
| A | GROUP 1 |
| B | GROUP 3 |
| C | GRUPE 3 |
| D | GROUP 3 |
| E | GROUP 2 |
| F | GROUP 4 |
| ⋮ | ⋮ |

SEPARATION INTO FIVE TYPES

| PRE-SORTING GROUP | |
|---|---|
| GROUP 1 | CARTRIDGES |
| GROUP 2 | BOTTLES |
| GROUP 3 | DRUMS |
| GROUP 4 | FIXING UNITS |
| GROUP 5 | OTHERS |

SORTING INTO FIVE TYPES OF
ASSEMBLY MATERIAL HANDLINGS

TRANSPORTATION OF
ASSEMBLY MATERIAL
HANDLINGS IN STACKED STATE

FIG. 12

```
STEP 3-1
DECOMPOSE AND
SORT BY MATERIALS
      ↓
STEP 3-2
SORT BY TYPES OF
SHIPMENT PROCESSING
(POST-SORTING PROCESSING)
      ↓
TO STEP 4
```

FIG. 13

| MATERIAL | SEPARATING MEANS |
|---|---|
| · TONER | VACUUM SUCTION |
| · CARRIER | VACUUM SUCTION |
| · IRON | DECOMPOSING/MAGNETIC SORTING |
| · ALUMINUM | DECOMPOSING/EDDY-CURRENT SORTING |
| · PLASTICS | DECOMPOSING/ERECTROSTATIC SORTING |
| ⋮ | ⋮ |

| POST-SORTING GROUP | MATERIAL | USAGE |
|---|---|---|
| GROUP 1 | ·PLASTIC<br>·TONER<br>·CARRIER | BLAST FURNACE REDUCER |
| GROUP 2 | ·IRON | REPRODUCTION OF IRON |
| GROUP 3 | ·ALUMINUM | REPRODUCTION OF ALUMINUM |
| ⋮ | ⋮ | ⋮ |

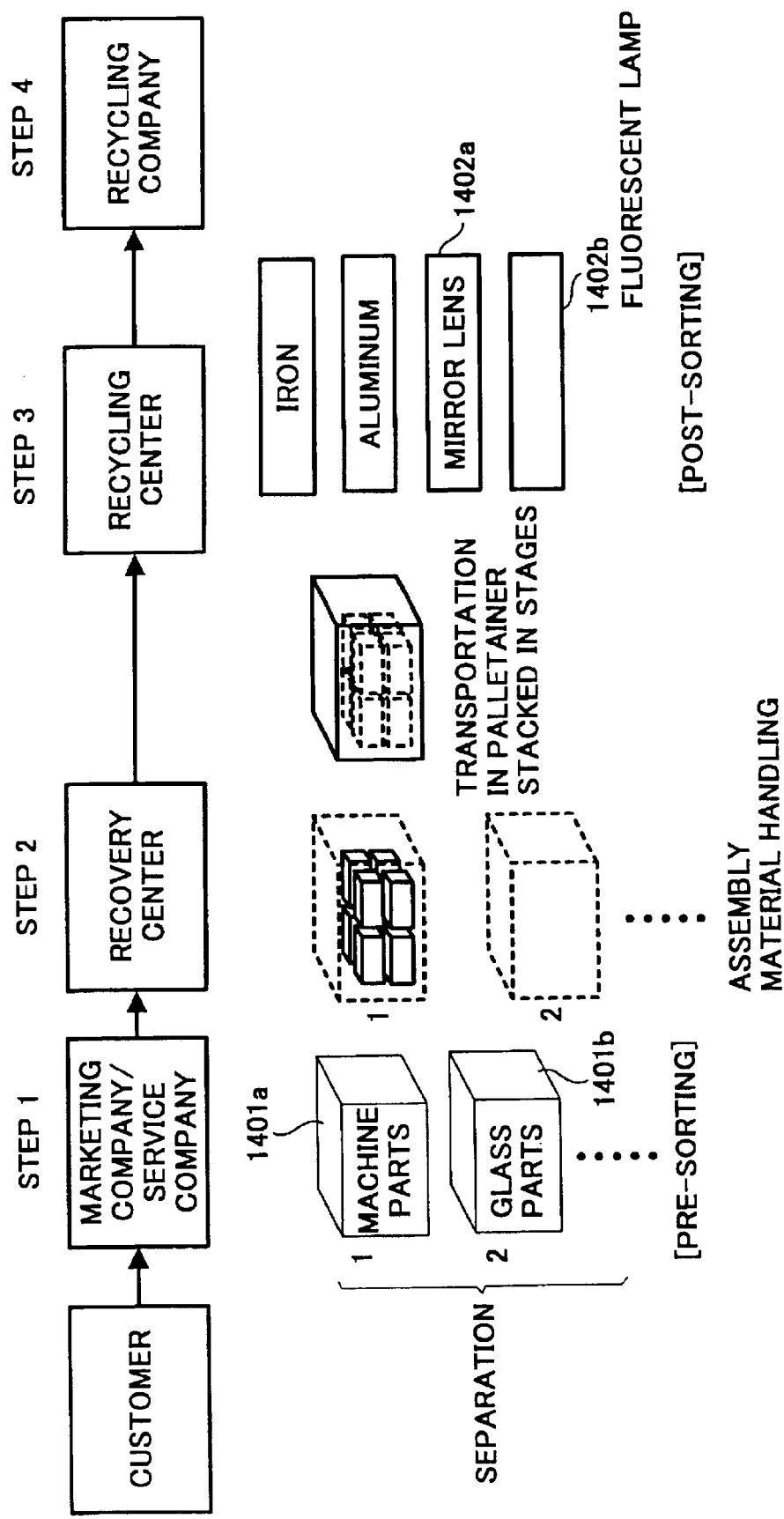

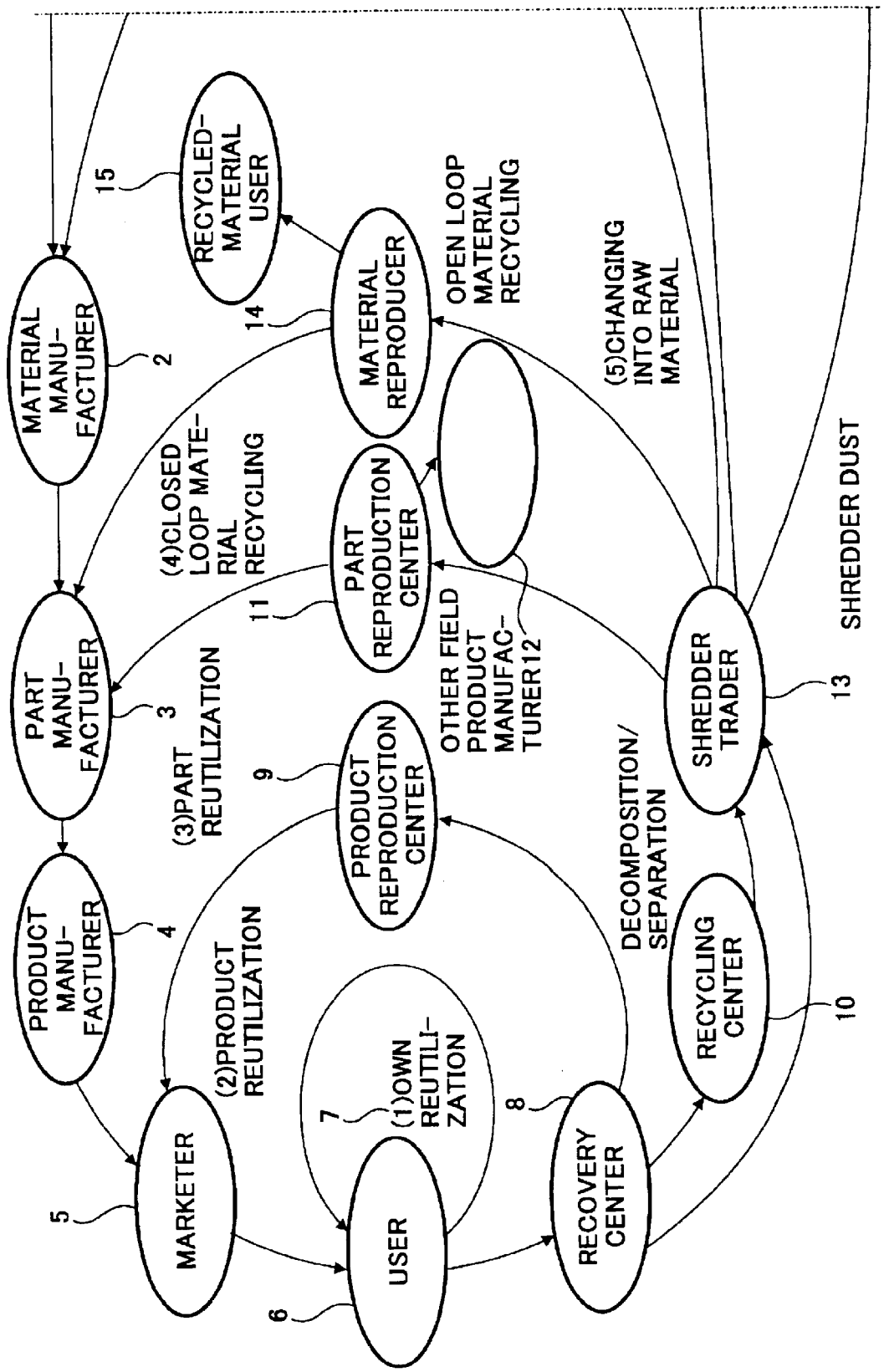

RECYCLING APPARATUS, RECYCLING METHOD, AND RECYCLED PRODUCT

BACKGROUND OF THE INVENTION

1) Field of the Invention

The present invention relates to a recycling apparatus, a recycling method, and a recycled product.

2) Description of the Related Art

In the contemporary society, giving consideration to environmental issues is recognized as more important than ever. Enterprises come to be evaluated based on their achievement in giving considerations to the environments. Therefore, it has become important for enterprises to carry out environmental protection activities. In order to effectively utilize resources and reduce wastes, it is urgently required to establish a recycling system that reuses products, parts, and materials by recycling them.

Recycling methods, or recycling processes, are broadly classified into the following six categories.

1. Own Reutilization

The own reutilization refers to a recycling processing of a product user reutilizing a part of the product. Taking a copying machine as an example, a user refills a toner into an empty toner container (i.e., a toner bottle) and uses the toner container again. In this case, the value of the item to be recycled (i.e., the toner bottle, in this case) is not lowered. Therefore, it can be said that the own reutilization has a largest effect of lowering the environmental burden, which can recycle products at minimum cost.

2. Product Reutilization

The product reutilization refers to a recycling processing of recovering a once-used product from a market (hereinafter referred to as a recovered product), and carrying out a predetermined reproduction processing to this recovered product, for reutilization of the product as a reproduced product. This processing has an advantage in that it has a very large effect of lowering the environmental burden, as a major part of the recovered product can be used again as it is.

3. Part Reutilization

The part reutilization refers to a recycling processing of taking out parts or units that constitute a recovered product from the recovered product, for reutilization of the taken-out parts or units again for new products. This processing has an advantage in that it has a large effect of lowering the environmental burden, as the process of manufacturing the parts or units can be omitted.

4. Material Recycling

The material recycling refers to a recycling processing of decomposing a recovered product into materials, sorting out the materials, and carrying out a certain processing to these materials, for reutilization of the materials as reproduced materials. The material recycling has a closed loop material recycling to reutilize the materials for products in the same field, and an open loop material recycling to utilize the materials for products in other fields.

5. Changing into Raw Materials

The changing into raw materials refers to a recycling processing of decomposing a recovered product into materials, sorting out the materials, and returning the materials to raw materials, for reutilization of the raw materials. Based on the changing of a used product into raw materials again, it is possible to realize zero wastes.

6. Energy Recovery

The energy recovery refers to a recycling processing of treating a recovered item to utilize energy obtained from this treating. As an example of the energy recovery, a recovered plastic is combusted to utilize the thermal energy generated from the combustion.

The above six types of recycling are described in the preferable order of 1, 2, 3, . . . , and 6. In other words, the own reutilization is the most preferable method. The next preferable method is the product reutilization, and the next desirable method is the part utilization. For enterprises, how to implement a continuous recycling based on the most preferable method by considering economics is an important point in promoting the recycling.

Products become inevitably old-fashioned in the market. Therefore, in general, a time comes when a product is not useful in the market (i.e., not useful for users) and the recycling the product has no economic value. Consequently, in actual practice, it is not possible to semipermanently recycle the recovered product based on only the most preferable method of the own reutilization. A product that has become old-fashioned as the product cannot be used based on the most preferable method of the own reutilization. Depending on an old-fashioned level, the product is recycled based on the least preferable recycling method in the above order. Therefore, an enterprise that implements recycling needs to carry out a plurality of types of recycling, instead of carrying out only one specific type of recycle processing.

The recycling processing is different depending on a kind of a recovered product (such as a copying machine, for example). Even for one kind of a recovered product, the recycling method is different depending on a part or a unit that constitutes the recovered product. Therefore, in promoting the recycling, it is necessary to carry out a plurality of types of recycling processing at the same time.

There is a recycling system described in Japanese Patent Application Laid-Open No. 2000-181958 as a conventional system that can effectively carry out the above recycling processing. FIG. 17 explains about the recycling system described in Japanese Patent Application Laid-Open No. 2000-181958. This recycling system has a plurality of stages as denoted by reference numerals 1 to 20. The stage 1 shows a production of a raw material. In general, a raw material supplier produces and supplies this raw material. The stage 2 shows a production of a raw material that uses a new raw material or a reproduced raw material. In general, a material manufacturer produces and supplies this material.

The stage 3 shows a production of a part that uses a new raw material or a reproduced raw material. In general, a part manufacturer produces and supplies this material. The stage 4 shows an assembly of a product that uses a new part or a reproduced part. In general, a product manufacturer assembles and supplies this product. The stage 5 shows a marketing of a product that uses a new part or a reproduced part. In general, a product marketer markets this product.

The stage 6 shows a product using state/maintenance state. In general, a user (in the market) uses the product. The stage 7 shows an own reutilization. The stage 8 shows a product recovery/selection. In general, the product is recovered from the user (in the market) to a predetermined recovery center, and the next stage (the stage 9 or the stage 10) is selected.

The stage 9 shows a reproduction of the product. In general, the product is sent from the recovery center to a predetermined product reproduction center, and the product is reproduced. The stage 10 shows a decomposition/sorting of the product. In general, the product is sent from the recovery center to a predetermined recycling center, and the product is reproduced. The stage 11 shows a reproduction of the part. In general, the product is sent from the recycling center to a predetermined part reproduction center, and the part is reproduced. The stage 12 shows a supply of the reproduced part to a product manufacturer in other field, which corresponds to the open recycling.

The stage 13 shows a crushing of the part or the product. A single material part is crushed, or a plurality of material parts are crushed and the materials obtained by crushing the parts are sorted. In general, the part(s) or the product is sent from the recycling center or the recovery center to a predetermined shredder trader, where the part(s) or the product is crushed and sorted. The stage 14 shows a reproduction of the material. The crushed parts from which the material can be reproduced are sent from the stage 13 to a material reproducer, who reproduces the material. When the reproduced material is sent to the part manufacturer at the stage 3, this corresponds to the closed loop material recycle processing. When the reproduced material is sent to a recycled-material user at the next stage 15, this corresponds to the open loop material recycle processing described later.

The stage 15 shows usage of the reproduced material. The reproduced material is sent from the stage 14 to the recycled-material user, who uses this recycled material. The stage 16 shows a changing of the material into a raw material. A shredder dust is changed into oil, or is thermally/chemically decomposed into a raw material. The stage 17 shows a changing of the material into a raw material. A printed-circuit board or a shredder dust is changed into a raw material based on metallurgical recycling. The stage 18 shows a using of the reproduced raw material. The reproduced raw materials are sent from the stage 16 and the stage 17 to a recycling company, who uses these reproduced raw materials. The stage 19 shows a recovery of thermal energy. A thermal energy recovery trader recovers thermal energy obtained by combusting the shredder dust. The stage 20 shows a final abandonment. In general, a final processing trader treats the wastes based on reclamation or the like.

The recycling system described in Japanese Patent Application Laid-Open No. 2000-181958 is used mainly in office automation (hereinafter, "OA") equipment such as a copying machine. It is also possible to extensively utilize this system in other products such as a home electric appliance and an automobile.

The recycling system described in Japanese Patent Application Laid-Open No. 2000-181958 can effectively realize a plurality of types of recycling methods in parallel. However, in some cases, it is difficult to implement the recycling unless the system is concretized to the characteristics of the item to be recycled such as consumable goods, for example.

Problems that arise when the item to be recycled is consumables of a product are explained by taking OA equipment as an example. Consumables of OA equipment include a toner, a toner bottle that contains a toner (hereinafter simply referred to as a bottle), a toner cartridge (hereinafter simply referred to as a cartridge), and a photo conductor drum.

A first problem of recycling consumables is a handling of the toner as powder. In general, the frequency of the consumables becoming in a spent state (i.e., the frequency of recycling the consumables) is higher than the frequency of recycling the product main body. The consumables are recovered independent of the product main body overwhelmingly in a state of being detached from the main body rather than they are recovered together with the main body in a state of being contained in the main body. When the cartridge is recovered independently, there is a risk that the toner leaked out from the cartridge stains the product main body and other consumable such as the photo conductor drum at the time of extracting the cartridge from the main body. This impairs the appearance of the product, and lowers the quality of the recovered product.

After the recovery, the handling of the toner as powder has the following problems. For example the cartridge is decomposed into parts to separate metal parts from resin parts at the time of recycling this material. At this time, the toner contained in the cartridge may leak out and fly in all directions in the air, and adhere to other items to be recycled such as the copying machine main body. This lowers the quality of the recovered products. The toner is also mixed into resin components that are to be recycled, and discolors the resins, which lowers the quality of the recovered parts.

The toner lowers not only the appearance of the recovered product but also the physicality. The toner components are mainly resins, and when they adhere to a metal part such as a metal frame of the copying machine main body, the toner components work as impurities and lower the metal quality of the resin part to be recycled.

There is a recycling system described in Japanese Patent Application Laid-Open No. 7-334583 as a conventional technique of constructing a system according to the characteristics of an item to be recycled. This recycling system has, an input section that inputs information about a product, a storage section that stores a database of information about reutilization of the product, a recycling processing method decision processing section that refers to the information about reutilization of the product in the database stored in the storage section, based on the information about the product input by the input section, and decides a method of recycling this product based on a recycling rule determined in advance, and a recycling plant facility controller that functions as an output section that outputs a result of the decision made to the next process.

According to the recycling system described in Japanese Patent Application Laid-Open No. 7-334583, it is possible to implement recycling of consumables of OA equipment based on a detailed recycling processing method decision.

A second problem of recycling consumables is that it is difficult to manage a consumable recycling quantity (or a generation quantity of consumables to be recycled). The recycling frequency of consumables is higher than the recycling frequency of a product main body. Among the consumables, the timing and the frequency of recovering the cartridge are different from those of the photo conductor drum. Therefore, it is difficult to manage each item of consumables at each time of recovering the consumables.

As a conventional technique for solving the second problem, there is a recycling system of recycling waste industrial products described in Japanese Patent Application Laid-Open No. 2000-84532. According to this recycling system, an electronic tag is attached to a waste product. When a waste product is received from a user, a reader/writer is used to write basic data necessary for the processing into the electronic tag. Thereafter, the reader/writer is used to read the information written on the tag or overwrite data on the tag, thereby to decide a proper processing route for each waste product.

However, according to the recycling system described in Japanese Patent Application Laid-Open No. 7-334583, a detailed method of recovering a waste product is not shown. One of stages at which the problem of handling the toner becomes obvious is a recovery stage. Therefore, even when the recycling system described in Japanese Patent Application Laid-Open No. 7-334583 is applied to the system of recovering the toner as consumables, it is not possible to prevent a reduction in the quality of the recovered product that occurs due to the handling of the toner.

When the system of recycling waste industrial products described in Japanese Patent Application Laid-Open No. 2000-84532 is applied to consumables, it is possible to efficiently manage the consumables. However, the work of writing and reading data to/from each one electronic tag attached to each consumable item is troublesome. There is relatively small difference in sizes between the electronic tag and a consumable item such as the cartridge. Therefore, at the time of recovering and transporting consumables, the electronic tags have an inconvenience of lowering the transportation efficiency of the consumables to a half.

There are also the following problems in the transportation efficiency of consumables. Not only the frequency of recovering consumables for recycling is different from that of the OA equipment, the sizes of these items are also different. Therefore, the consumables are recovered separately from products, which results in the increase in the transportation frequency. The increase in the transportation frequency leads to the increase in the transportation cost and transportation energy. As a result, the recycling is implemented opposite to the environmental protection.

The problems in the recycling of consumables are described above. Service parts are also a part of a product main body like consumables. The service parts are common to the consumables in that the sizes of the service parts are different from the sizes of the product main body and that the frequency and the timing of recovering the service parts for recycling are different from those of the product main body. Therefore, the above problems also occur when the service parts are items for recycling.

SUMMARY OF THE INVENTION

It is an object of this invention to solve at least the problems in the conventional art.

The recycling apparatus according to one aspect of the present invention comprises an item information input unit for inputting information about a recycling item; a first sorting condition preparing unit that prepares a first sorting condition for sorting the recycling item into one of a plurality of decomposing groups corresponding to conditions for decomposing the recycling item; a second sorting condition preparing unit that prepares a second sorting condition for sorting recycling parts obtained by decomposing the recycling item sorted out according to the first sorting condition, into at least one of a plurality of material groups corresponding to material of each of the recycling parts; a third sorting condition preparing unit that prepares a third sorting condition for sorting the recycling parts sorted out according to the second sorting condition, into at least one of a plurality of processing groups corresponding to types of recycling processing to be carried out; and a transmitting unit that transmits the first sorting condition, the second sorting condition, and the third sorting condition to respective fields where the recycling item and the recycling parts are sorted.

The recycling method according to still another aspect of the present invention comprises inputting information about a recycling item; preparing a first sorting condition for sorting the recycling item into one of a plurality of decomposing groups corresponding to conditions for decomposing the recycling item; preparing a second sorting condition for sorting recycling parts obtained by decomposing the recycling item sorted out according to the first sorting condition, into at least one of a plurality of material groups corresponding to material of each of the recycling parts; preparing a third sorting condition for sorting the recycling parts sorted out according to the second sorting condition, into one of a plurality of processing groups corresponding to types of recycling processing to be carried out; and transmitting the first sorting condition, the second sorting condition, and the third sorting condition to respective fields where the recycling item and the recycling parts are sorted.

The recycled product according to still another aspect of the present invention is manufactured by a method comprising inputting information about recycling item; preparing a first sorting condition for sorting the recycling item into one of a plurality of decomposing groups corresponding to conditions for decomposing the recycling item; preparing a second sorting condition for sorting recycling parts obtained by decomposing the recycling item sorted out according to the first sorting condition, into at least one of a plurality of material groups corresponding to material of each of the recycling parts; preparing a third sorting condition for sorting the recycling parts sorted out according to the second sorting condition, into one of a plurality of processing groups corresponding to types of recycling processing to be carried out; transmitting the first sorting condition, the second sorting condition, and the third sorting condition to respective fields where the recycling item and the recycling parts are sorted; and manufacturing the recycled product using the recycling parts.

These and other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 12 explains about a step 3 according to the second embodiment;

FIG. 13 exemplifies material separation information used to decompose a cartridge into materials and separate the materials into different groups of materials at the step 3;

FIG. 16 explains about each step of a recycling system according to a third embodiment of the present invention to which the recycling apparatus of the present invention is applied.

DETAILED DESCRIPTION

Exemplary embodiments of a recycling apparatus, a recycling method, and a recycled product according to the present invention are explained in detail below with reference to the accompanying drawings.

Figure 1:
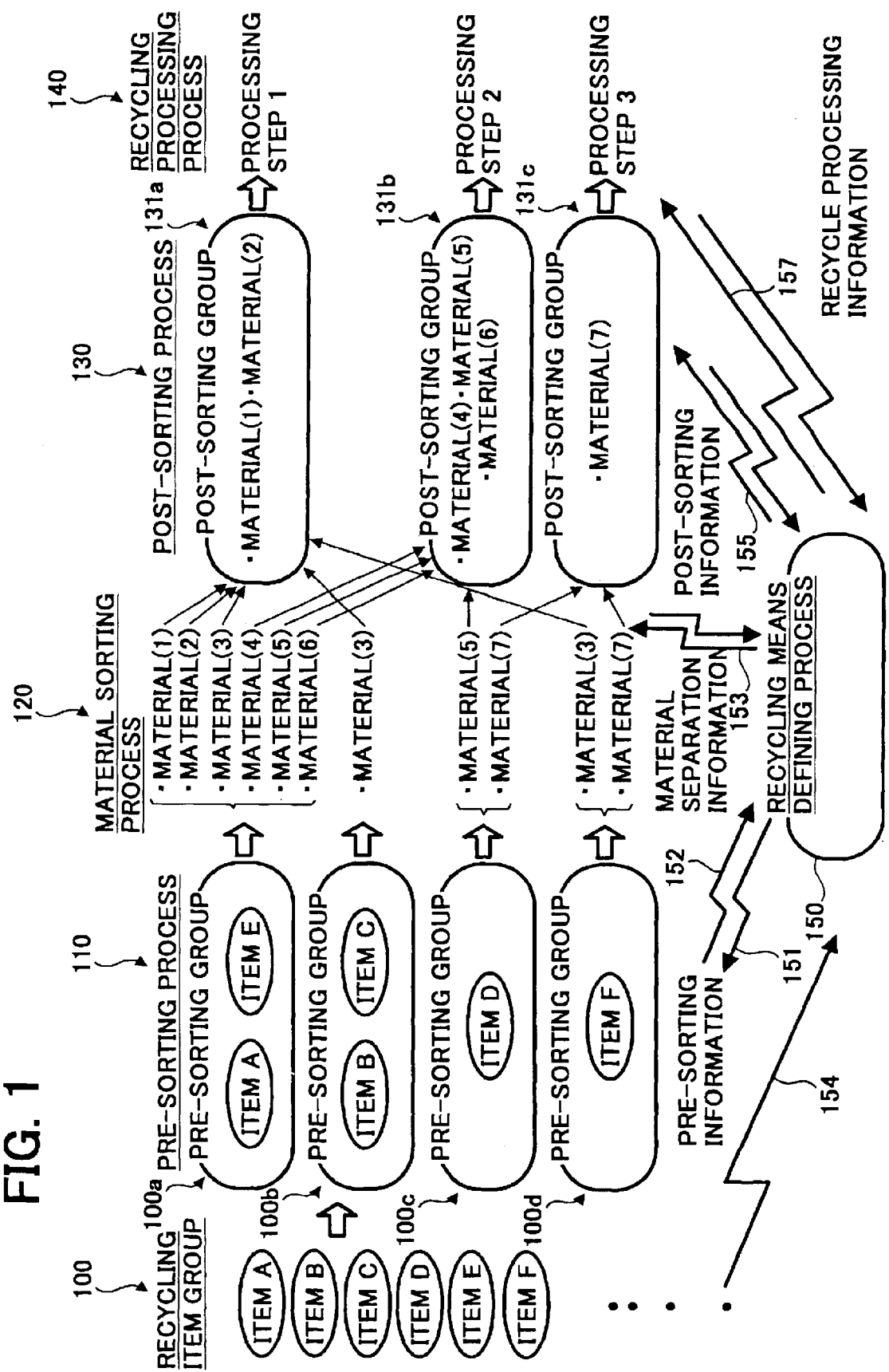
FIG. 1 explains about a recycling system to which a recycling apparatus and a recycling method according to a first embodiment of the present invention are applied.

FIG. 1 shows a recycling system to which a recycling apparatus and a recycling method according to a first embodiment of the present invention are applied. The recycling system shown in FIG. 1 is applied to recycle an image formation apparatus structured as OA equipment such as a copying machine, a facsimile, and a printer.

The recycling system has a pre-sorting process 110 for recovering a recycling item group 100 including items A, B, C, and so on, and sorting the items into a plurality of pre-sorting groups 100a to 100d. In the pre-sorting process 110, the items in the recycling item group 100 are sorted into the pre-sorting groups 100a to 100d corresponding to workability of decomposing the recycling items carried out in a material separating process 120 as the next process. The workability refers to the work efficiency determined based on conditions of whether it is possible to decompose and sort recycling items by using a common facility and common tools or whether it is possible to sort these items in the same work environment.

The recycling system has a material separating process 120 for decomposing the recycling items sorted out in the pre-sorting groups 100a to 100d into recycling parts, and separating the recycling parts corresponding to materials (1), (2), (3), . . . , and (7) (i.e., corresponding to materials in the first embodiment). The materials in the material separating process 120 mainly refer to raw materials. However, in the present invention, the materials are not limited to raw materials. For example, the materials may be parts or sub-units scheduled to be used again. In the material separating process 120, the facilities and tools and the work environment used for the separation work are different for each of the pre-sorting groups 110a to 100d. Therefore, basically, the separation work is carried out in each working field that is different for each of the pre-sorting groups 110a to 100d.

The recycling system has a post-sorting process 130 for sorting the recycling parts sorted out corresponding to materials, into a plurality of post-sorting groups 131a, 131b, and 131c that correspond to types of recycling processing carried out thereafter. The types of recycling processing carried out thereafter refer to the reproduction of the materials such as the changing of the materials into oil or refining the material, and a recovery of thermal energy by combusting the materials. The recycling parts sorted out into the post-sorting groups 131a, 131b, and 131c are transported to corresponding processing steps in a recycling processing process 140, and are recycled respectively.

The recycling system has a recycling means defining process 150 for preparing information that is necessary to sort the recycling items and the recycling parts in the pre-sorting process 110, the material separating process 120, and the post-sorting process 130 respectively, and transmitting this information to each field where each processing is carried out. In the present embodiment, the recycling apparatus is installed in the field of the recycling means defining process 150. The recycling apparatus inputs item information 154 on the recycling item group 100, transmits pre-sorting information 151 to the pre-sorting process 110, transmits material separation information 153 to the material separating process 120, and transmits post-sorting information 155 to the post-sorting process 130.

The recycling apparatus transmits recycling information 157 to the recycling processing process 140 when necessary. An information terminal device such as a personal computer not shown is installed in each field of the pre-sorting process 110, the material separating process 120, the post-sorting process 130, and the recycling processing process 140. Each information terminal device communicates with the recycling apparatus via the Internet or a LAN.

Figure 2:
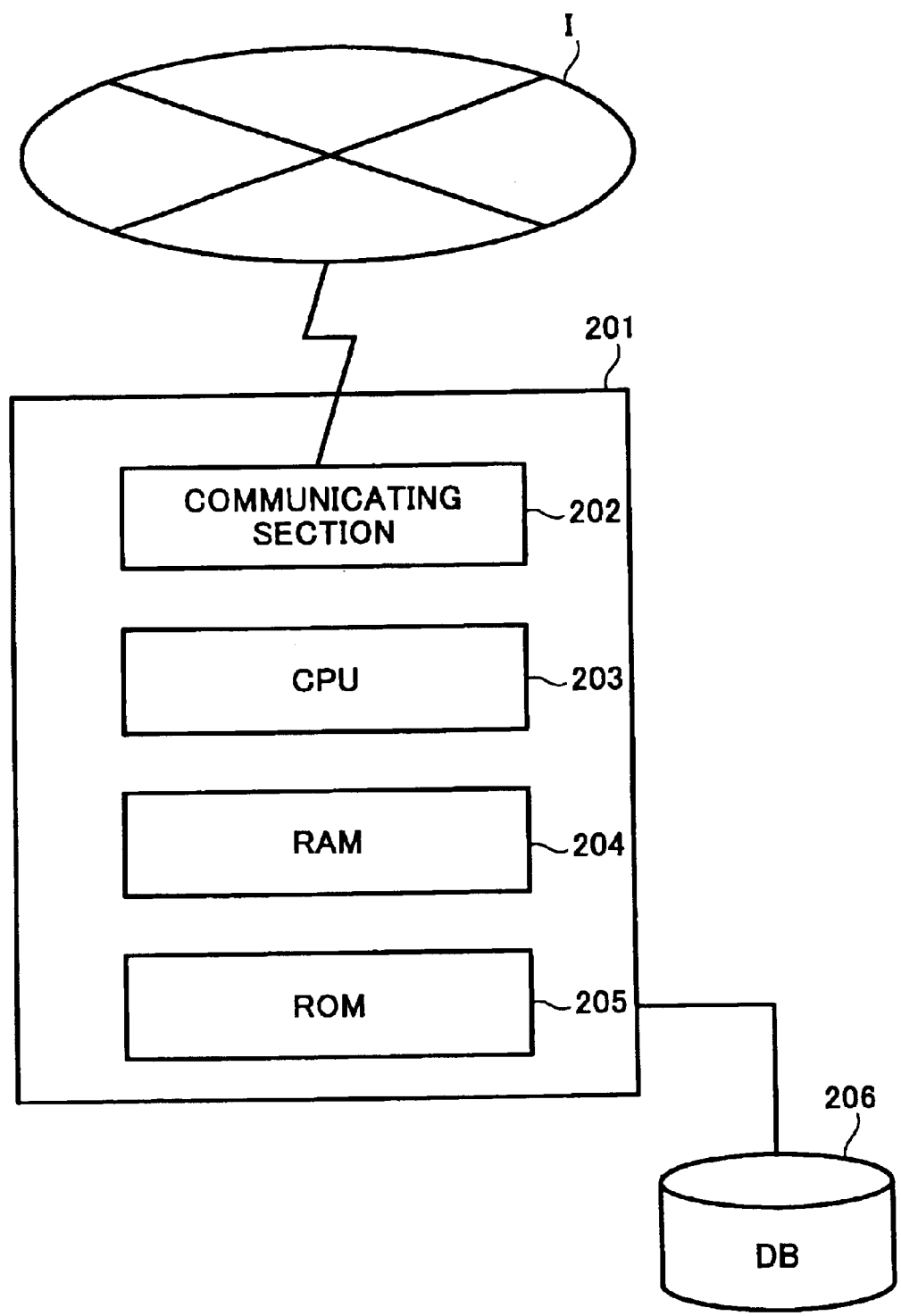
FIG. 2 is a block diagram of a recycling apparatus that is common to all of the embodiments.

FIG. 2 is a block diagram that explains about a recycling apparatus 201 that is common to the embodiments of the present invention. The recycling apparatus 201 includes a communicating section 202, a central processing unit (CPU) 203, a RAM (Random Access Memory) 204, a ROM (Read Only Memory) 205, and a database 206. The communicating section 202 is connected to the Internet I, and inputs the item information 154 on the recycling items, and transmits the pre-sorting information 151, the material separation information 153, and the post-sorting information 155 to the pre-sorting process 110, the material separating process 120, and the post-sorting process 130 respectively. The CPU 203 prepares the pre-sorting information 151 used to sort the recycling items shown in the item information 154 into the pre-sorting groups 100a to 100d corresponding to the conditions for decomposing the recycling items, the material separation information 153 used to separate the recycling parts obtained by decomposing the recycling items according to the pre-sorting information 151, into the materials (1), (2), (3), . . . , and (7), and the post-sorting information 155 used to sort the recycling parts sorted out according to the material separation information 153, into the post-sorting groups 131a, 131b, and 131c that correspond to the types of recycling processing carried out thereafter.

The RAM 204 is used as a field memory for the CPU 203 to carry out the processing. The RAM 204 also temporarily stores the information received by the communicating section 202, and the data (including the pre-sorting information, the material separation information, and the post-sorting information) obtained based on the processing carried out by the CPU 203. When necessary, the database 206 accumulates the data stored in the RAM 204.

The ROM 204 stores a program and like that the CPU 203 uses to carry out the processing. The database 206 also accumulates data concerning the image formation apparatus. For example, the database 206 accumulates data on types, numbers, and standards of parts mounted on the image formation apparatus corresponding to manufacturers, machine types, and manufacturing years, etc., information concerning works that are necessary to decompose parts, and information of recycling processing methods used to reutilize parts or change the parts into raw materials again.

In the first embodiment, the recycling apparatus operates as follows. When the market or a user offers the recycling item group 100 including the used items A, B, C, and so on, a worker in a management center of the recycling system visits the user to collect these recycling items. The worker keeps an information terminal device such as a mobile computer not shown, and transmits the item information 154 to the recycling apparatus 201.

When the worker transmits the item information 154 to the recycling apparatus 201, the recycling apparatus 201 can automatically obtain machine types and quantities of the recycling items from the field where the recycling items occurred.

When an image formation apparatus is the recycling item, the item information 154 includes information about a manufacturer, a machine type, and a manufacturing date of this image formation apparatus. When a part of an image formation apparatus such as a photo conductor drum is the recycling item, the item information 154 includes information about a manufacturer of the part, a type of the machine on which the part is mounted, and a manufacturing date. The recycling apparatus 201 obtains information concerning the decomposition work of the recycling item corresponding to the item information 154, from the database 206. The recycling apparatus 201 prepares the pre-sorting information 151 used to sort the recycling items into the pre-sorting groups 100a to 100d, which makes it possible to decompose the recycling items in the same field using the same facility and environment with high work efficiency. The communicating section 202 transmits this pre-sorting information 151 to the personal computer in the pre-sorting process 110.

The pre-sorting information 151 is displayed on the screen of the personal computer. In the pre-sorting process 110, the worker sorts the recycling items A, B, C, and so on into the groups 100a to 100d based on the pre-sorting information 151 displayed on the screen or the pre-sorting information 151 printed out.

Figure 3:
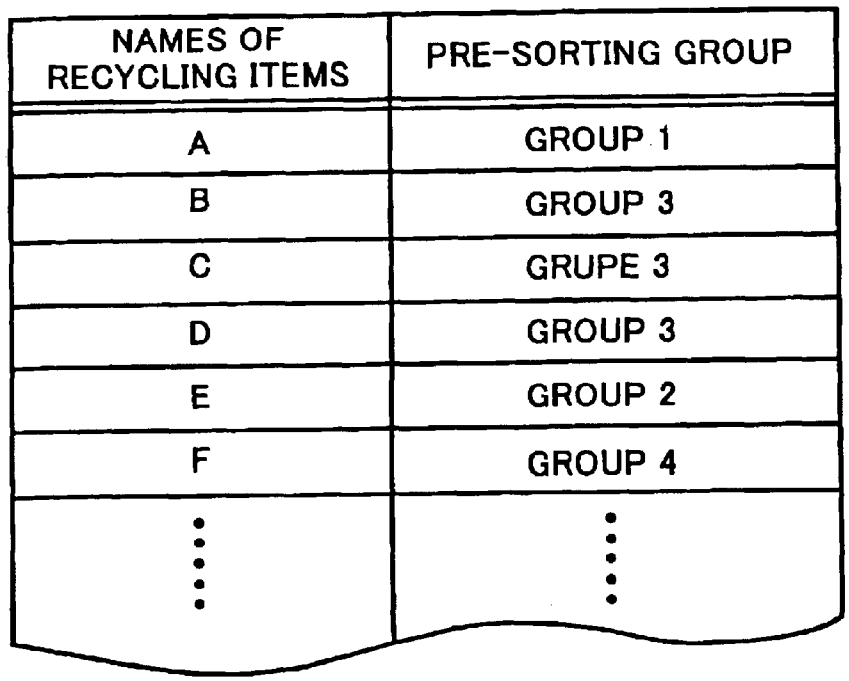
FIG. 3 exemplifies a format of pre-sorting information according to the first embodiment.

FIG. 3 exemplifies a format of the pre-sorting information 151. The pre-sorting information 151 can include a table that compares names of the recycling items A, B, C, and so on with the pre-sorting groups 100a to 100d (i.e., a group 1, a group 2, and so on) to which the recycling items A, B, C, and so on belong.

When the recycling items are service parts of OA equipment, the pre-sorting groups 100a to 100d may be a group of glass parts, and a group of machine parts. It is also possible to sort the parts of the image formation apparatus into a group of toner bottles, a group of photo conductor drums, and fixing units of OA equipment. It is also possible to sort the parts into a group of containers that accommodate powder, and a group of containers that accommodate liquid to make it possible to handle the containers in the same group.

When the recycling items are consumables of OA equipment, the container that accommodates powder may be a toner cartridge. The powder accommodated in the toner cartridge is a toner or a carrier.

Figure 4:
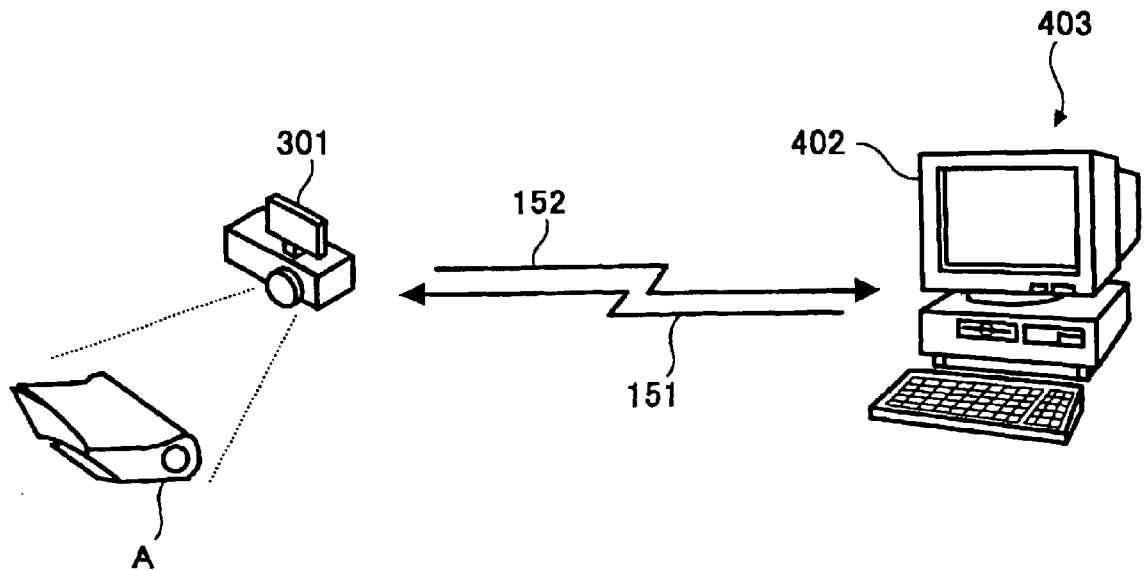
FIG. 4 explains about a processing carried out when it is not possible to decide an item name of an item to be recycled in the pre-sorting process.

In the recycling system to which the recycling apparatus 201 of the present embodiment is applied, the recycling apparatus 201 is connected with the personal computer in the pre-sorting process 110 via the Internet I, as explained above. Therefore, when the worker in the pre-sorting process 110 cannot decide a name of a recycling item, the worker picks up an image of this recycling item (for example, the item A) with a known image recognizing unit such as a digital camera 301, as shown in FIG. 4. The worker transmits the picked-up image to the recycling apparatus 210 as image information 152. In the recycling means defining process 150, a type of the recycling item is decided based on this image. The communicating section 202 transmits this information together with the pre-sorting information 151 to the pre-sorting process 110.

When containers that accommodate powder and containers that accommodate liquid are separated into two different pre-sorting groups, the containers that accommodate powder and the containers that accommodate liquid are stored into two separate containers as shown later. By storing these containers in the two separate containers, it is possible to isolate the same pre-sorting group of recycling items from the other same pre-sorting group of recycling items. Based on this isolation, it is possible to prevent such a situation that a toner that leaks out from a cartridge stains other recycling items that do not accommodate toners.

It is possible to identify and manage the containers that store recycling items, based on appearances, sizes, name displays, and attached bar codes of the containers that are different between the pre-sorting groups 100a to 100d. When each container has a constant capacity that is different for each pre-sorting group, it is possible to identify the capacity and weight of recycling items accommodated in each container. Therefore, it is possible to manage the quantity or weight of recycling items accommodated in each container based on the type of the container (i.e., the type of the pre-sorting group) and the quantity of the containers.

As explained above, according to the present embodiment, it is possible to manage recycling items relatively easily and in high precision, by managing the recycling items based on each container in the pre-sorting process 110. It is preferable that each container that accommodates the recycling items has a box shape, so that these box-shaped containers can be piled up. By piling up the containers, it is possible to load these containers in a stacked state on a transporting unit such as a truck, which can improve the transportation efficiency.

Frequently, the work of the pre-sorting process 110 is carried out in the market (or at the user side). According to the recycling system, it is also possible to pre-sort the recycling items in the recycling item recovery center that is other than the market (or the user side). In the recycling item recovery center, it is possible to set the recycling items collected from a plurality of users into one container package, and transport this package to the next process. With this arrangement, it is possible to improve the efficiency of transporting the recycling items.

The recycling apparatus compares the recycling items that belong to the pre-sorting groups 100a to 100d with the data accumulated in the database 206, and decides materials obtained by decomposing the recycling items, and types of decomposition works. The recycling apparatus transmits a result of the decision to the material sorting process 120 as the material separation information 153.

Figure 5:
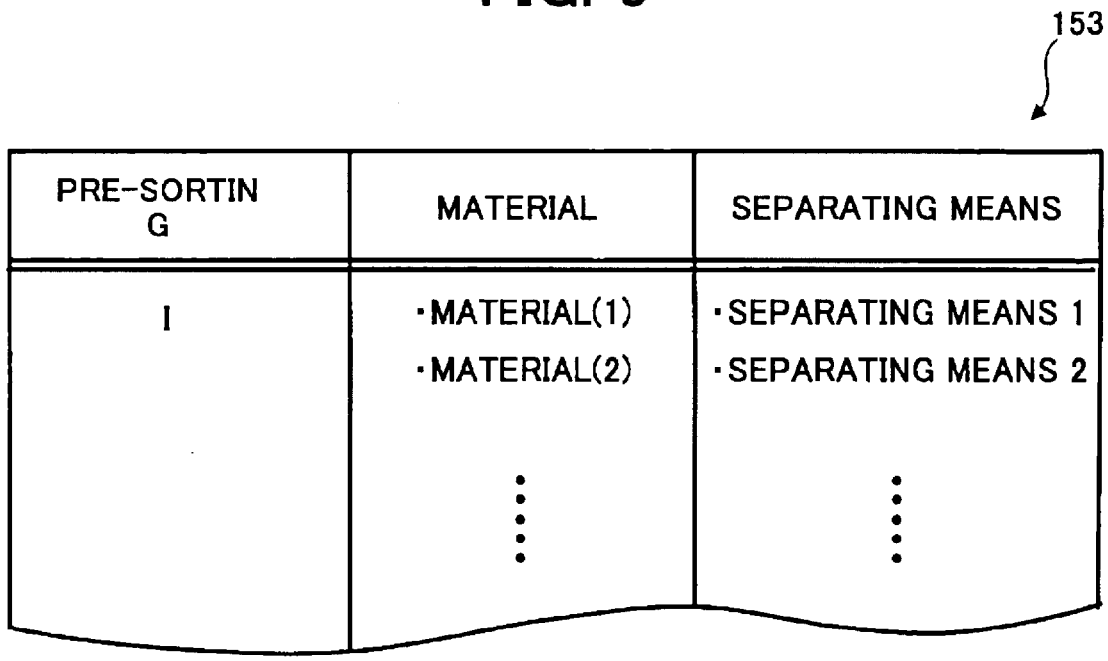
FIG. 5 exemplifies material separation information according to the first embodiment.

FIG. 5 exemplifies the material separation information 153. In FIG. 5, the material separation information 153 shows a sate that a separating unit 1 decomposes a recycling item that belongs to a certain pre-sorting group (shown 1 in FIG. 5) to obtain a material (1), and a separating unit 2 decomposes this recycling item to obtain a material (2). When the materials (1) and (2) are raw materials, they are plastics or metals, for example. The separating units 1 and 2 carry out separation works such as a decomposition of the recycling item, a collection of powder or liquid, a crushing of the item, and a separation of decomposed materials by using magnetic force. These works carried out in the material separating process 120 are common in that a certain physical treatment is carried out to the recycling item.

When the material is powder, the material separation information 153 prescribes the separating unit as that of absorbing the powder using air. Based on this prescription, the recycling apparatus according to the present embodiment can avoid the powder flying in all directions in the air during the separation work, thereby to prevent the powder from polluting the work environment.

The communicating section 202 of the recycling apparatus 210 transmits the material separation information 153 to the personal computer installed in the field of the material separating process 120, and the personal computer displays this information on the screen. In the material separating process 120, the worker decomposes the recycling items A, B, C, and so on, according to the material separation information 153 displayed on the screen or the material separation information 153 printed out, thereby to obtain the materials (1), (2), and so on. The worker transmits the separated materials (1), (2), and so on to the post-sorting process 130.

When the material includes powder or liquid, a sucking unit is used to suck the powder or the liquid in the material separating process 120. Particularly, when powder is treated, a device equipped with an explosion-proof unit or a safety unit is utilized to prevent dust explosion.

The recycling apparatus 201 compares the materials shown in the material separation information 153 with the data accumulated in the database 206, and decides a recycling processing process to be applied to each of the materials (1), (2), and so on. The recycling apparatus 201 sets the materials into each group to which a common recycling processing is carried out such as the refining of materials, the changing of materials into oil, and the recovery of thermal energy from materials, and prepares the post-sorting information 155.

Figure 6:
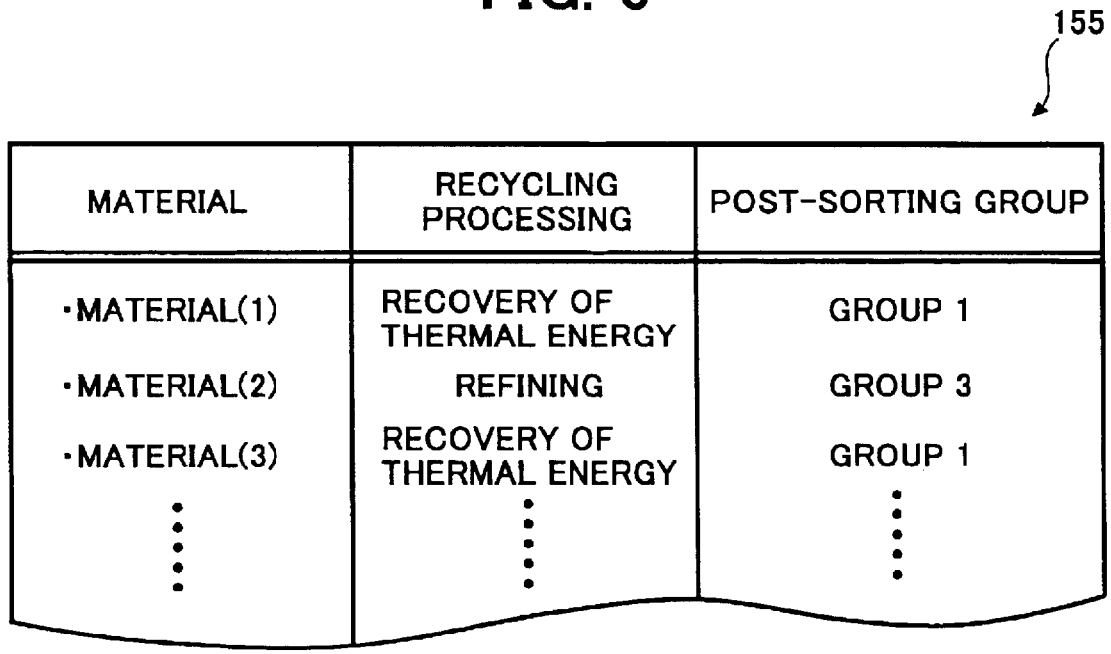
FIG. 6 exemplifies a format of post-sorting information according to the first embodiment.

FIG. 6 exemplifies the post-sorting information 155. In FIG. 6, the post-sorting information 155 shows a relationship between the types of recycling processing applied to the materials (1), (2), (3), and so on and the post-sorting groups (that are described as a group 1 and a group 3 in FIG. 6) to which these materials belong. It is known from FIG. 6 that, in the recycling processing process 140, the thermal energy recovery processing is carried out to the materials (1) and (3), and the refining is carried out to the material (2). The materials (1) and (3) to which the same recycling processing is carried out belong to the post-sorting group 1, and the material (2) belongs to the other group of the post-sorting group 2.

The communicating section 202 of the recycling apparatus 210 transmits the post-sorting information 155 to the personal computer installed in the field of the post-sorting process 130, and the personal computer displays this information on the screen. In the post-sorting process 130, the worker separates the materials (1), (2), and so on, according to the post-sorting information 155 displayed on the screen or the post-sorting information 155 printed out, thereby to prepare the post-sorting groups 131*a* to 131*c*. The worker transmits the post-sorting groups 131*a* to 131*c* to corresponding processing steps 1 to 3 in the recycling processing process 140.

Figure 7:
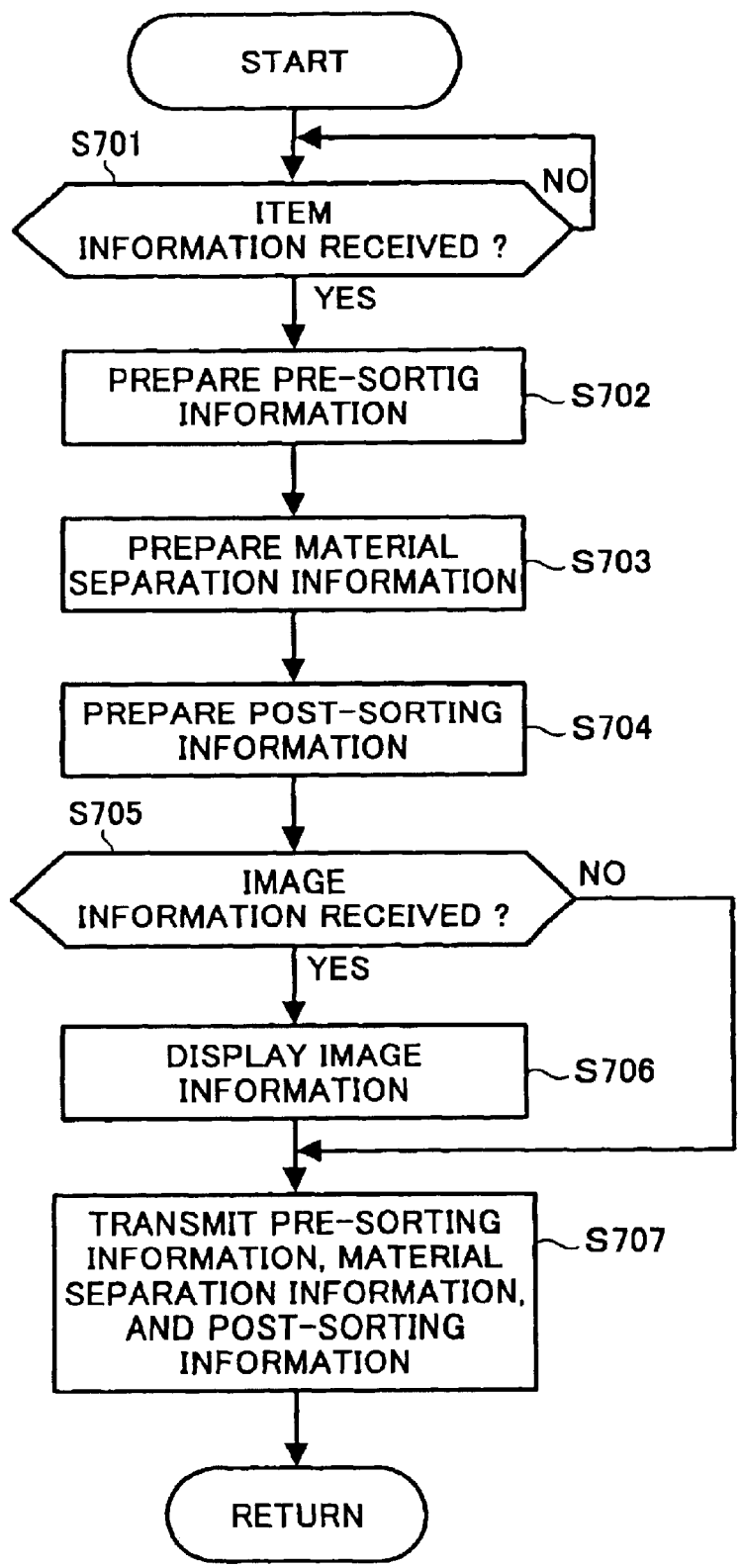
FIG. 7 is a flowchart that explains about a recycling method according to the first embodiment.

FIG. 7 is a flowchart that explains about a recycling method carried out in the recycling apparatus 201. The recycling apparatus 201 first decides whether the communicating section 202 has received the item information 154 (step S701). When it is decided that the communicating section 202 has not received the item information 154 (No at step S701), the recycling apparatus 201 waits until the communicating section 202 receives the item information 154.

When the communicating section 202 has received the item information 154 (Yes step S701), the recycling apparatus 201 reads the data concerning a method of decomposing the recycling item included in the item information, from the database 206, and prepares the pre-sorting information (step S702). Next, the recycling apparatus 201 reads the data concerning materials obtained by decomposing the recycling item, from the database 206, and prepares the material separation information (step S703). Further, the recycling apparatus 201 reads the data concerning a recycling processing carried out to each material based on the data on the materials obtained from the material separation information, from the database 206, and prepares the post-sorting information (step S704).

The recycling apparatus 201 decides whether image information of the recycling item has been transmitted from the field of the pre-sorting process (step S705). When it is decided that no image information has been transmitted (No at step S705), the communicating section 202 transmits the pre-sorting information, the material separation information, and the post-sorting information to the personal computer in the field where the pre-sorting processing is carried out, the personal computer in the field where the material separation processing is carried out, and the personal computer in the field where the post-sorting processing is carried out respectively (step S707).

On the other hand, when image information of the recycling item has been transmitted from the pre-sorting process to the recycling apparatus 201 (Yes step S705), the recycling apparatus 201 displays the image for the operator (step S706). The operator decides a name of the recycling item based on the displayed image, and transmits this name to the pre-sorting process together with the pre-sorting information.

According to the first embodiment, it is possible to transmit proper sorting information to each field of the plurality of recycling processes. Therefore, it is possible to increase the efficiency of the plurality of types of recycling processing carried out in parallel. Further, according to the present embodiment, the database of the recycling apparatus can store machine types and quantities of recycling products, and names of recycling items, and it is possible to retrieve these pieces of information when necessary. Therefore, it is possible to efficiently carry out the handling, management, and transportation of the recycling items.

The present invention is not limited to the first embodiment. In each field of the pre-sorting process 110, the material separating process 120, and the post-sorting process 130, the personal computer in each field can record information about quantities and qualities of the recycling products and recycling parts carried out from each field to the next process during a constant period of time. It is possible to transmit these pieces of information to the recycling means defining process 150 via the Internet I. It is possible to manage the quantities of the recycling products and recycling parts based on capacities and numbers of the containers that contain these products and parts respectively.

A recycling system according to a second embodiment of the present invention is explained next. In the second embodiment, the recycling system to which the recycling apparatus described in the first embodiment is applied handles consumables of OA equipment as recycling items. The recycling system according to the second embodiment shows material separation information and post-sorting information more in detail.

Figure 8:
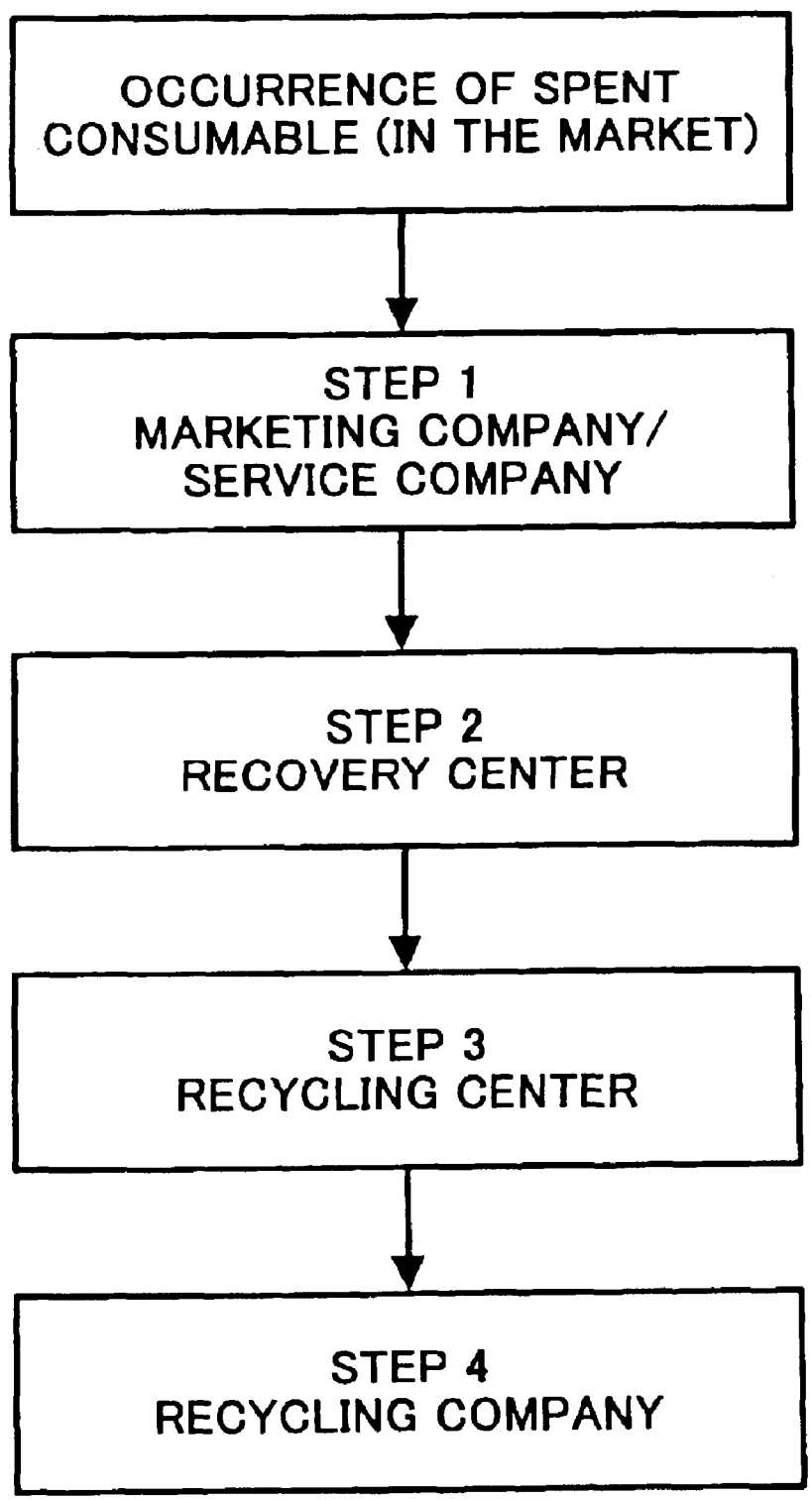
FIG. 8 explains about each step of a recycling system according to a second embodiment of the present invention to which the recycling apparatus of the present invention is applied.

FIG. 8 explains about each step of the recycling system according to the second embodiment to which the recycling apparatus of the present invention is applied. The processing of the system in the second embodiment is explained with reference to FIG. 8.

Step 1

Figures 9A, 9B:
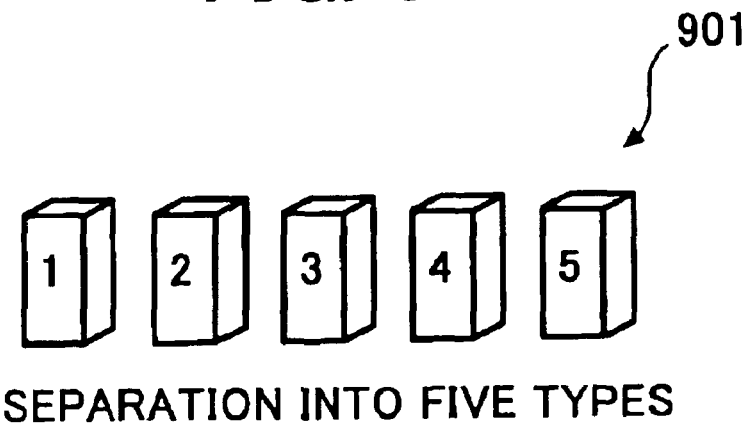
FIGS. 9A and 9B explain about accommodation of consumables based on separation of these items according to the second embodiment.

When spent consumables occur in some field, an OA equipment marketing company or a product maintenance company (i.e., a marketing company/service company) visits this field, and recovers the spent consumables, at step 1. FIGS. 9A and 9B explain about accommodation of consumables based on separation of these items. FIG. 9A shows a state that the consumables are separated into five groups, and are accommodated in corresponding types of material handlings 901. The containers 901 are divided into five types corresponding to the following five groups of items, each container containing a specific group of recycling items as shown in FIG. 9B.

1. cartridges
2. bottles
3. drums
4. fixing units
5. others

In the second embodiment, this separation work corresponds to the pre-sorting process.

Step 2

Figure 10:
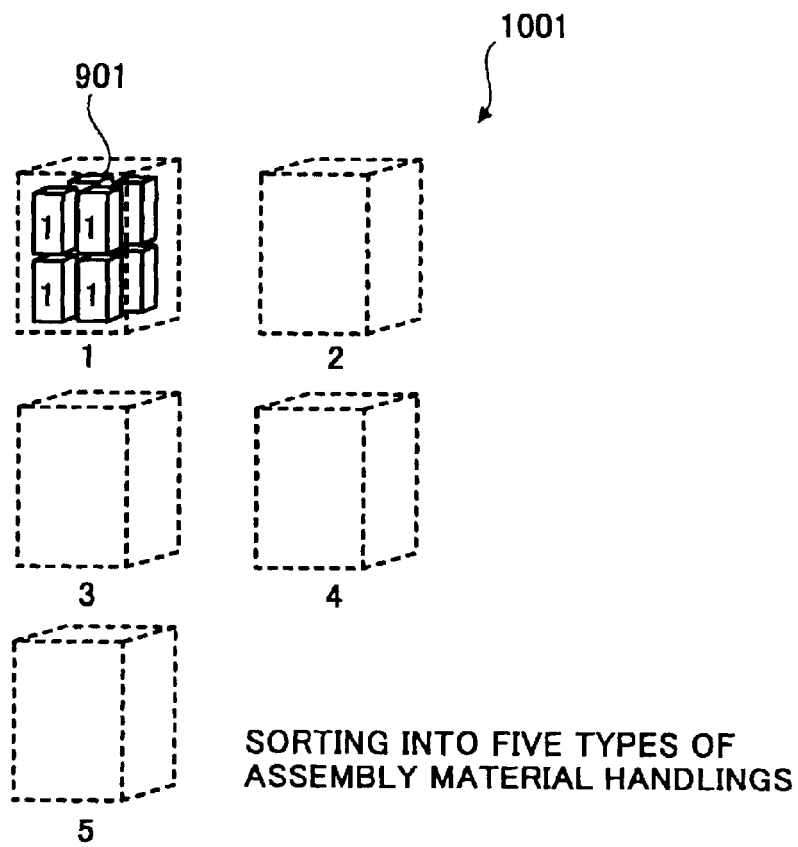
FIG. 10 explains about pre-sorting groups according to the second embodiment.

The five kinds of consumables are grouped into each pre-sorting group 1001 as shown in FIG. 10. The consumables are recovered in respective material handlings 901. FIG. 10 shows a state that the consumables are sorted into five groups, and are accommodated in respective material handlings 901 sorted in five groups. Each type of material containers is transferred the assembly material handling 1001 corresponding to each group. A palletainer may be used for the assembly material handling 1001.

The recovered consumables are temporarily stored in each assembly material handling 1001. The weight of the consumables is managed for each assembly material handling 1001. The consumables are sorted into groups, each group having consumables of substantially the same size and weight. Therefore, the number of consumables accommodated in each assembly material handling 1001 is substantially constant. As a result, it is possible to obtain the total weight of the recovered consumables, based on the type of the consumables accommodated in each assembly material handling 1001 and the number of the assembly material handlings 1001. It is of course possible to accurately manage the total weight of the consumables by measuring the weight of each assembly material handling 1001.

Step 3

Figure 11:
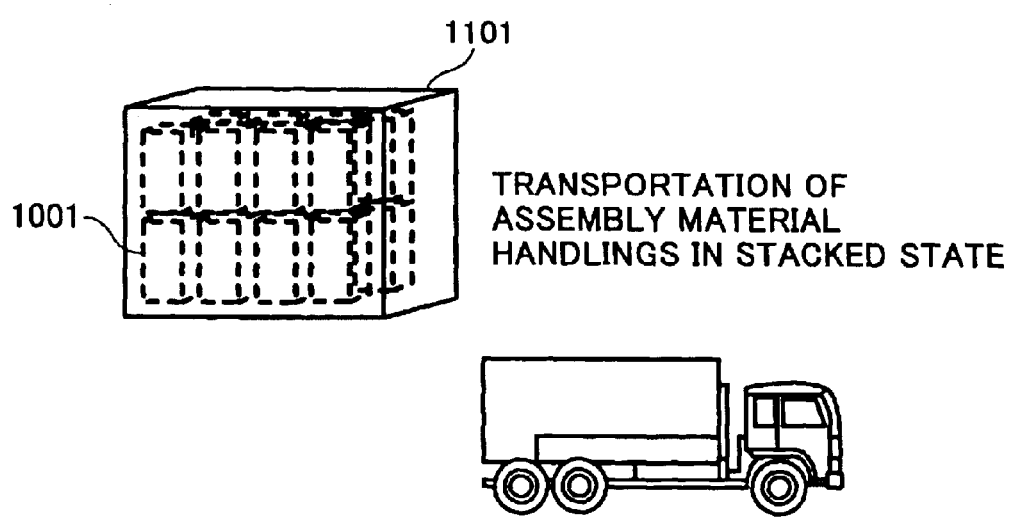
FIG. 11 explains about a state of transporting an aggregate of material containers according to the second embodiment.

The assembly material handlings 1001 are transported from the recovery center to the recycling center. In this case, the assembly material handlings 1001 are stacked on the transporting unit such as a truck, as shown in FIG. 11, which can improve the load efficiency of a transportation container 1101.

At step 3, further two processes are carried out as shown in FIG. 12. At step 3-1 shown in FIG. 12, the recycling items are decomposed into materials, and the materials are separated into different groups. FIG. 13 exemplifies material separation information used at step 3-1 to decompose a cartridge into materials and separate the materials into different groups of materials at step 3. In FIG. 13, the material separation information shows the materials obtained by decomposing the cartridge as a recycling item, and methods of separating respective materials.

As shown in FIG. 13, in the material separation information it is prescribed that, as the toner is powder, the cartridge is compressed with a compressor not shown, and the vacuum sucking unit is used to suck the toner. At step 3-2, the sorted materials are sorted again into the post-sorting groups. The post-sorting groups are prepared by sorting the materials following the post-sorting information shown in FIG. 14, for example.

Step 4

Figures 14, 15:
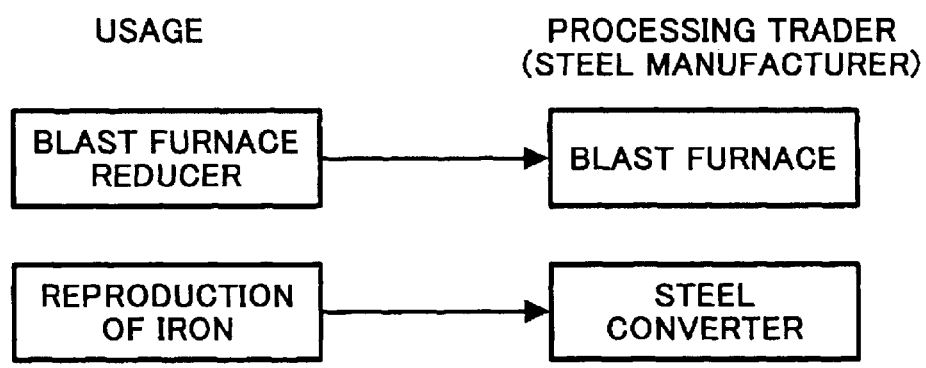
FIG. 14 explains about post-sorting information according to the second embodiment.
FIG. 15 explains about a step 4 according to the second embodiment.
Figure 17B:
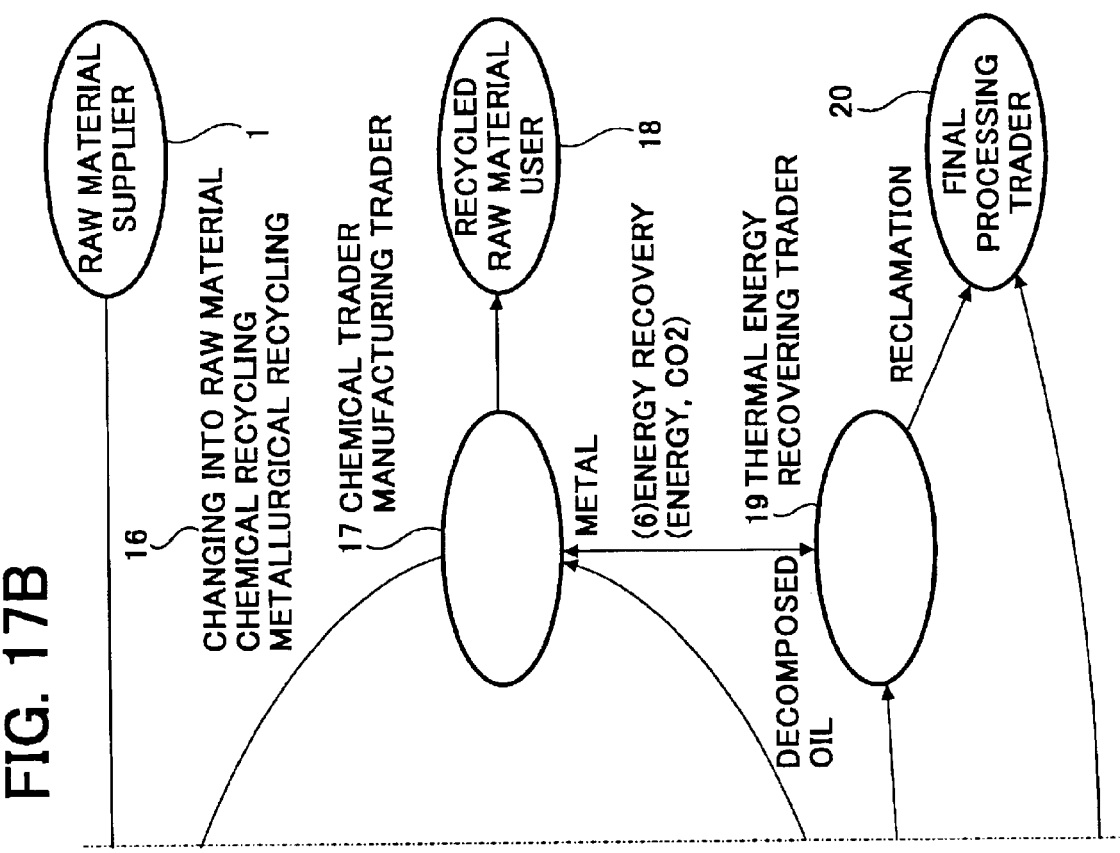
FIG. 17 explains about a conventional recycling system.

The post-sorting group is transported to a recycling company according to the usage shown in FIG. 14. For example, when the material is to be used as a blast furnace reducer, the material is transported to a blast furnace of a steel manufacturer. When the material is to be used for the reproduction of iron, the material is transported to a steel manufacturer, and is treated in a steel converter of the steel manufacturer.

A recycling system according to a third embodiment of the present invention is explained next. In the third embodiment, the recycling system to which the recycling apparatus described in the first embodiment is applied recycles service parts of OA equipment.

The basic processing flow of the recycling system according to the third embodiment is similar to that shown in FIG. 8. At step 1, a marketing company/service company carries out a pre-sorting of service parts. At step 2, a recovery center sorts assembly material handlings. At step 3, a recycling center decomposes the service parts into materials, separates the materials, and sorts the materials (i.e., the post-sorting) for each shipment processing. At step 4, a recycling company treats the materials.

When the service parts are the recycling items, the pre-sorting conditions for the pre-sorting and the post-sorting conditions for the post-sorting are different from the corresponding conditions when the consumables are the recycling items like in the second embodiment. In other words, as shown in FIG. 16, in the third embodiment, a machine part group 1401a and a glass part group arise in the pre-sorting processing. Further, in the post-sorting process, a mirror lens group 1402a and a fluorescent lamp group 1402b arise, in addition to the iron group and the aluminum group.

As explained above, according to a first aspect of the present invention, it is possible to prepare information for instructing a processing and a transportation destination of a recycling item, for each process. Therefore, there is an effect that it is possible to provide a recycling apparatus that can efficiently realize a plurality of types of recycling processing in parallel. Further, there is an effect that it is possible to provide a recycling apparatus that can prevent one recycling item from affecting other recycling items during a sorting process thereby lowering the values of these other recycling items.

According to a second aspect of the present invention, there is an effect that it is possible to provide a recycling apparatus that can prevent powder from being mixed into or adhering to other recycling items during a decomposition and sorting work or a recycling work thereby lowering the qualities of these recycling items.

According to a third aspect of the present invention, there is an effect that it is possible to provide a recycling apparatus that can prevent liquid from being mixed into or adhering to other recycling items during decomposition and sorting work or a recycling work thereby lowering the qualities of these recycling items.

According to a fourth aspect of the present invention, it is possible to set powder in a group and recycle the powder efficiently at one position. Therefore, there is an effect that it is possible to provide a recycling apparatus that can increase the efficiency of the recycling processing.

According to a fifth aspect of the present invention, there is an effect that it is possible to provide a recycling apparatus that can prevent powder from flying in all directions in the air during a sorting work, and prevent powder or liquid from staining other parts during a recycling processing thereby lowering the values of these other parts as recycling items.

According to a sixth aspect of the present invention, there is an effect that it is possible to provide a recycling apparatus that can effectively utilize consumables as recycling items.

According to a seventh aspect of the present invention, there is an effect that it is possible to provide a recycling apparatus that can prevent a toner or a carrier within a toner cartridge from staining other parts during a recycling processing thereby lowering the values of these parts as recycling items.

According to an eighth aspect of the present invention, there is an effect that it is possible to provide a recycling apparatus that can prevent a toner bottle of OA equipment from affecting other recycling items during a sorting process thereby lowering the values of these other recycling items.

According to a ninth aspect of the present invention, there is an effect that it is possible to provide a recycling apparatus that can prevent a photo conductor drum from affecting other recycling items during a sorting process thereby lowering the values of these other recycling items.

According to a tenth aspect of the present invention, there is an effect that it is possible to provide a recycling apparatus that can prevent a fixing unit from affecting other recycling items during a sorting process thereby lowering the values of these other recycling items.

According to an eleventh aspect of the present invention, there is an effect that it is possible to provide a recycling apparatus that can effectively utilize service parts as recycling items.

According to a twelfth aspect of the present invention, there is an effect that it is possible to provide a recycling apparatus that can prevent a glass part from affecting other recycling items during a sorting process thereby lowering the values of these other recycling items.

According to a thirteenth aspect of the present invention, there is an effect that it is possible to provide a recycling apparatus that can prevent a machine part from affecting other recycling items during a sorting process thereby lowering the values of these other recycling items.

According to a fourteenth aspect of the present invention, it is possible to promptly transmit information even if each recycling processing field exists at a far distance. It is also possible to store the information, and it is possible to refer to the information when necessary. Therefore, there is an effect that it is possible to provide a recycling apparatus that can increase the recycling efficiency.

According to a fifteenth aspect of the present invention, there is an effect that it is possible to provide a recycling apparatus that can promptly transmit information even if each recycling processing field exists at a far distance.

According to a sixteenth aspect of the present invention, it is possible to prepare information for instructing a processing and a transportation destination of a recycling item, for each process. Therefore, there is an effect that it is possible to provide a recycling method that can efficiently realize a plurality of types of recycling processing in parallel. Further, there is an effect that it is possible to provide a recycling method that can prevent one recycling item from affecting other recycling items during a sorting process thereby lowering the values of these other recycling items.

According to a seventeenth aspect of the present invention, there is an effect that it is possible to provide a recycling method that can prevent powder from being mixed into or adhering to other recycling items during a decomposition and sorting work or a recycling work thereby lowering the qualities of these recycling items.

According to an eighteenth aspect of the present invention, there is an effect that it is possible to provide a recycling method that can prevent liquid from being mixed into or adhering to other recycling items during a decomposition and sorting work or a recycling work thereby lowering the qualities of these recycling items.

According to a nineteenth aspect of the present invention, it is possible to set powder in a group and efficiently recycle the powder at one position. Therefore, there is an effect that it is possible to provide a recycling method that can increase the efficiency of the recycling processing.

According to a twentieth aspect of the present invention, there is an effect that it is possible to provide a recycling method that can prevent powder from flying in all directions in the air during a sorting work, and prevent powder or liquid from staining other parts during a recycling processing thereby lowering the values of these other parts as recycling items.

According to a twenty-first aspect of the present invention, there is an effect that it is possible to provide a recycled product manufactured based on a method of manufacturing a recycling product that can efficiently realize a plurality of types of recycling processing in parallel. Further, there is an effect that it is possible to provide a recycled product manufactured based on a method of manufacturing a recycling product that can prevent one recycling item from affecting other recycling items during a sorting process thereby lowering the values of these other recycling items.

According to a twenty-second aspect of the present invention, there is an effect that it is possible to provide a recycled product manufactured as at least one of a container that accommodates powder or liquid ink, and powder ink.

According to a twenty-third aspect of the present invention, there is an effect that it is possible to provide a recycled product manufactured based on a method of manufacturing a recycling product that can prevent powder from being mixed into or adhering to other recycling items during a decomposition and sorting work or a recycling work thereby lowering the qualities of these recycling items.

According to a twenty-fourth aspect of the present invention, there is an effect that it is possible to provide a recycled product manufactured based on a method of manufacturing a recycling product that can prevent liquid from being mixed into or adhering to other recycling items during a decomposition and sorting work or a recycling work thereby lowering the qualities of these recycling items.

According to a twenty-fifth aspect of the present invention, there is an effect that it is possible to provide a recycled product manufactured based on a method of manufacturing a recycling product that can increase the efficiency of the recycling processing, by grouping powder and efficiently recycling the group of powder at one position.

According to a twenty-sixth aspect of the present invention, there is an effect that it is possible to provide a recycled product manufactured based on a method of manufacturing a recycling product that can prevent powder from flying in all directions in the air during a sorting work, and prevent powder or liquid from staining other parts during a recycling processing thereby lowering the values of these other parts as recycling items.

The present document incorporates by reference the entire contents of Japanese priority document, 2002-060956 filed in Japan on Mar. 6, 2002.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A recycling apparatus comprising:
    an item information input unit for inputting information about a recycling item;
    a first sorting condition preparing unit that prepares a first sorting condition for sorting the recycling item into one of a plurality of decomposing groups corresponding to conditions for decomposing the recycling item;
    a second sorting condition preparing unit that prepares a second sorting condition for sorting recycling parts obtained by decomposing the recycling item sorted out according to the first sorting condition, into at least one of a plurality of material groups corresponding to material of each of the recycling parts;
    a third sorting condition preparing unit that prepares a third sorting condition for sorting the recycling parts sorted out according to the second sorting condition, into at least one of a plurality of processing groups corresponding to types of recycling processing to be carried out; and
    a transmitting unit that transmits the first sorting condition, the second sorting condition, and the third sorting condition to respective fields where the recycling item and the recycling parts are sorted.

2. The recycling apparatus according to claim 1, wherein the information about the recycling item includes information about whether the recycling item includes a container that contains powder, and the first sorting condition includes a condition for sorting the recycling item based on whether the recycling item includes the container that contains powder.

3. The recycling apparatus according to claim 2, wherein the container is a cartridge and the powder is a toner or a carrier.

4. The recycling apparatus according to claim 1, wherein the information about the recycling item includes information about whether the recycling item includes a container that contains a liquid, and the first sorting condition includes a condition for sorting the recycling item based on whether the recycling item includes the container that contains the liquid.

5. The recycling apparatus according to claim 1, wherein the information about the recycling item includes information about whether the recycling item includes a container that contains powder, and the second sorting condition includes a condition for sorting the recycling item based on whether the recycling item includes the container that contains powder.

6. The recycling apparatus according to claim 5, wherein the second sorting condition includes information that indicates to vacuum suck the powder.

7. The recycling apparatus according to claim 1, wherein the recycling items are consumables of office automation equipment.

8. The recycling apparatus according to claim 1, wherein the information about the recycling item includes information about whether the recycling item is a toner bottle of office automation (OA) equipment, and the first sorting condition includes a condition for sorting the recycling item based on whether the recycling item is the toner bottle.

9. The recycling apparatus according to claim 1, wherein the information about the recycling item includes information about whether the recycling item is a photo conductor drum, and the first sorting condition includes a condition for sorting the recycling item based on whether the recycling item is the photo conductor drum.

10. The recycling apparatus according to claim 1, the information about the recycling item includes information about whether the recycling item is a fixing unit, and the first sorting condition includes a condition for sorting the recycling item based on whether the recycling item is the fixing unit.

11. The recycling apparatus according to claim 1, wherein the recycling item is a consumable of office automation equipment.

12. The recycling apparatus according to claim 11, wherein the information about the recycling item includes information about whether the recycling item includes glass parts, and the first sorting condition includes a condition for sorting the recycling item based on whether the recycling item includes glass parts.

13. The recycling apparatus according to claim 11, wherein the information about the recycling item includes information about whether the recycling item includes machine parts, and the first sorting condition includes a condition for sorting the recycling item based on whether the recycling item includes machine parts.

14. The recycling apparatus according to claim 1, wherein the item information input unit is capable of inputting the information via the Internet.

15. The recycling apparatus according to claim 1, wherein the transmitting unit is capable of transmitting the first sorting condition, the second sorting condition, and the third sorting condition via the Internet.

16. A recycling method comprising:
    inputting information about a recycling item;
    preparing a first sorting condition for sorting the recycling item into one of a plurality of decomposing groups corresponding to conditions for decomposing the recycling item;
    preparing a second sorting condition for sorting recycling parts obtained by decomposing the recycling item sorted out according to the first sorting condition, into at least one of a plurality of material groups corresponding to material of each of the recycling parts;
    preparing a third sorting condition for sorting the recycling parts sorted out according to the second sorting condition, into one of a plurality of processing groups corresponding to types of recycling processing to be carried out; and
    transmitting the first sorting condition, the second sorting condition, and the third sorting condition to respective fields where the recycling item and the recycling parts are sorted.

17. The recycling method according to claim 16, wherein the inputting includes inputting information about whether the recycling item includes a container that contains powder, and the first sorting condition includes a condition for sorting the recycling item based on whether the recycling item includes the container that contains powder.

18. The recycling method according to claim 16, wherein the inputting includes inputting information about whether the recycling item includes a container that contains a liquid, and the first sorting condition includes a condition for sorting the recycling item based on whether the recycling item includes the container that contains the liquid.

19. The recycling method according to claim 16, wherein the inputting includes inputting information about whether the recycling item includes a container that contains powder, and the second sorting condition includes a condition for sorting the recycling item based on whether the recycling item includes the container that contains powder.

20. The recycling method according to claim 19, wherein the second sorting condition includes information that indicates to vacuum suck the powder.

21. A recycled product manufactured based on a method of manufacturing a recycling product, the method comprising:

inputting information about recycling item;

preparing a first sorting condition for sorting the recycling item into one of a plurality of decomposing groups corresponding to conditions for decomposing the recycling item;

preparing a second sorting condition for sorting recycling parts obtained by decomposing the recycling item sorted out according to the first sorting condition, into at least one of a plurality of material groups corresponding to material of each of the recycling parts;

preparing a third sorting condition for sorting the recycling parts sorted out according to the second sorting condition, into one of a plurality of processing groups corresponding to types of recycling processing to be carried out;

transmitting the first sorting condition, the second sorting condition, and the third sorting condition to respective fields where the recycling item and the recycling parts are sorted; and manufacturing the recycled product using the recycling parts.

22. The recycled product according to claim 21, wherein the recycled product is at least one of a container that accommodates powder or liquid ink, and powder ink.

23. The recycled product according to claim 21, wherein the inputting includes inputting information about whether the recycling item includes a container that contains powder, and the first sorting condition includes a condition for sorting the recycling item based on whether the recycling item includes the container that contains powder.

24. The recycled product according to claim 21, wherein the inputting includes inputting information about whether the recycling item includes a container that contains a liquid, and the first sorting condition includes a condition for sorting the recycling item based on whether the recycling item includes the container that contains the liquid.

25. The recycled product according to claim 21, wherein the inputting includes inputting information about whether the recycling item includes a container that contains powder, and the second sorting condition includes a condition for sorting the recycling item based on whether the recycling item includes the container that contains powder.

26. The recycled product according to claim 25, wherein the second sorting condition includes information that indicates to vacuum suck the powder.

* * * * *